(12) United States Patent
Hongo

(10) Patent No.: US 12,068,653 B2
(45) Date of Patent: Aug. 20, 2024

(54) COIL, STATOR MEMBER, STATOR, AND MOTOR

(71) Applicant: ASTER CO., LTD., Akita (JP)

(72) Inventor: Takenobu Hongo, Fukushima (JP)

(73) Assignee: ASTER CO., LTD., Yokote (JP)

( * ) Notice: Subject to any disclaimer, the term of this patent is extended or adjusted under 35 U.S.C. 154(b) by 323 days.

(21) Appl. No.: 17/609,317

(22) PCT Filed: May 1, 2020

(86) PCT No.: PCT/JP2020/018415
§ 371 (c)(1),
(2) Date: Nov. 5, 2021

(87) PCT Pub. No.: WO2020/226134
PCT Pub. Date: Nov. 12, 2020

(65) Prior Publication Data
US 2022/0224180 A1    Jul. 14, 2022

(30) Foreign Application Priority Data

May 8, 2019 (JP) ................................ 2019-088141

(51) Int. Cl.
*H02K 3/28* (2006.01)
*H02K 1/16* (2006.01)
*H02K 3/12* (2006.01)
*H02K 3/48* (2006.01)

(52) U.S. Cl.
CPC ................ *H02K 3/28* (2013.01); *H02K 1/16* (2013.01); *H02K 3/12* (2013.01); *H02K 3/48* (2013.01)

(58) Field of Classification Search
CPC .. H02K 3/28; H02K 1/16; H02K 3/12; H02K 3/48

USPC ......................................... 310/179, 201, 208
See application file for complete search history.

(56) References Cited

U.S. PATENT DOCUMENTS

| 8,575,798 | B2 | 11/2013 | Takahashi et al. |
| 9,577,498 | B2 | 2/2017 | Isoda |
| 9,729,030 | B2 | 8/2017 | Isoda |
| 10,211,710 | B2 | 2/2019 | Hongo |
| 10,483,029 | B2 | 11/2019 | Inaba |

(Continued)

FOREIGN PATENT DOCUMENTS

| CN | 102782995 A | 11/2012 |
| CN | 103683617 A | 3/2014 |

(Continued)

OTHER PUBLICATIONS

Supplementary European Search Report dated May 30, 2022, directed to EP Application No. 20802243.4; 4 pages.

(Continued)

*Primary Examiner* — Jose A Gonzalez Quinones
(74) *Attorney, Agent, or Firm* — Morrison & Foerster LLP

(57) ABSTRACT

There are provided a coil, a stator member, a stator, and a motor that can, in the case of joining (connecting) a busbar and the coil's terminals, simplify control necessary for joining such as positioning, actualize downsizing of a device (welding device or stator manufacturing device), and improve efficiency of joining work.
The coil is configured by winding a conductor, and its first and second terminals are extended out on a side of one surface of the coil.

10 Claims, 4 Drawing Sheets

(56) References Cited

U.S. PATENT DOCUMENTS

| | | |
|---|---|---|
| 10,742,097 B2 | 8/2020 | Hongo |
| 11,095,177 B2 | 8/2021 | Koga |
| 11,804,757 B2 | 10/2023 | Hongo |
| 2010/0194214 A1 | 8/2010 | Takahashi et al. |
| 2010/0201212 A1 | 8/2010 | Urano et al. |
| 2012/0286593 A1 | 11/2012 | Yokogawa |
| 2013/0181569 A1 | 7/2013 | Nakagawa et al. |
| 2014/0070646 A1* | 3/2014 | Isoda ............... H02K 15/0062 310/71 |
| 2015/0128406 A1 | 5/2015 | Isoda et al. |
| 2016/0315525 A1 | 10/2016 | Hongo |
| 2016/0344269 A1 | 11/2016 | Yabe et al. |
| 2017/0154719 A1 | 6/2017 | Inaba |
| 2019/0006921 A1 | 1/2019 | Hongo |
| 2020/0235647 A1 | 7/2020 | Koga et al. |
| 2020/0259381 A1 | 8/2020 | Koga et al. |
| 2020/0287446 A1 | 9/2020 | Hongo |
| 2020/0366146 A1 | 11/2020 | Koga et al. |
| 2021/0135512 A1 | 5/2021 | Koga et al. |
| 2021/0194306 A1 | 6/2021 | Koga |

FOREIGN PATENT DOCUMENTS

| | | | |
|---|---|---|---|
| CN | 105829010 A | 8/2016 | |
| EP | 3085486 A1 * | 10/2016 | ............. B23K 20/02 |
| EP | 3085486 A1 | 10/2016 | |
| JP | 2003-348782 A | 12/2003 | |
| JP | 3136235 U | 10/2007 | |
| JP | 2009-89456 A | 4/2009 | |
| JP | 2012-110204 A | 6/2012 | |
| JP | 2012-249344 A | 12/2012 | |
| JP | 2013-5541 A | 1/2013 | |
| JP | 2014-90567 A | 5/2014 | |
| WO | 2011/108736 A1 | 9/2011 | |
| WO | 2015/199044 A1 | 12/2015 | |
| WO | 2019/059295 A1 | 3/2019 | |
| WO | 2019/065460 A1 | 4/2019 | |

OTHER PUBLICATIONS

International Search Report and Written Opinion mailed Jul. 28, 2020, directed to International Application No. PCT/JP2020/018415; 17 pages.

Notice of Reasons for Refusal dated Sep. 26, 2023, directed to JP Application No. 2019-088141; 6 pages.

The First Office Action dated Nov. 6, 2023, directed to CN Application No. 202080033860.9; 15 pages.

* cited by examiner (A)

(B)

COIL, STATOR MEMBER, STATOR, AND MOTOR

CROSS-REFERENCE TO RELATED APPLICATIONS

This application is a U.S. national stage application under 35 U.S.C. § 371 of International Application. No. PCT/JP2020/018415, filed May 2020, which claims the priority of JP Application No. 2019-088141, filed May 8, 2019, the entire contents of each of which are incorporated herein by reference.

FIELD OF THE DISCLOSURE

The present invention relates to a coil, a stator member, a stator, and a motor.

BACKGROUND OF THE DISCLOSURE

Conventionally, edgewise coils that are composed of stacked steel plates manufactured by press punching are known. Such edgewise coils are adopted, for example, in stators of motors.

In this case, a stator is formed by sequentially attaching molded coils (edgewise coils) to a plurality of slots (teeth) on the inner peripheral surface of an annular stator core, and connecting one end of each of the coils, which are annularly arranged, to a busbar.

In more detail, each of the annularly arranged coils has a pair of terminals (long terminals). The pair of terminals is a portion in which a pair of ends, which are the beginning and end of the coil, are extended out from a helical structure portion (turn portion) along helical traveling directions. The pair of terminals are aligned on one side (e.g., one short side) of the turn portion of the coil, and one of the terminals is extended out on the side to be an inner peripheral surface of the annually arranged coils and the other is extended out on the side to be an outer peripheral surface of the annually arranged coils. Both the terminals are then connected to a rod-shaped (semi-circular) or annular busbar, which extends in a circumferential direction of the stator core, by welding or the like (refer to Patent Literature 1, for example).

CITATION LIST

Patent Literature

Patent Literature 1: Japanese Patent Application Laid-Open No. 2009-89456

SUMMARY OF THE DISCLOSURE

Technical Problem

However, in the case of attaching the conventional coils to the stator core and joining (connecting) the busbar and the terminals, a joining unit (for example, a welding device or a joining device) has to be moved between the terminals on the side to be the inner peripheral surface of the annularly arranged coils (stator core) and the terminals on the side to be the outer peripheral surface thereof, which results in complications regarding control necessary for joining, such as positioning. Furthermore, the movement range of the joining unit (welding device or the like) increases, thus preventing downsizing of the device (joining unit or stator manufacturing device) and also limiting efficiency of joining work.

In view of these actual circumstances, an object of the present invention is to provide a coil, a stator member, a stator, and a motor that are configured to, in the case of joining (connecting) a busbar and the coil's terminals, simplify control necessary for joining such as positioning, actualize downsizing of a device (joining unit) or stator manufacturing device), and improve efficiency of joining work.

Solution to Problem

An aspect of the present invention provides a coil including: a main body made of a conductor with a helical structure; and a first terminal and a second terminal extended out from the main body. The first terminal and the second terminal are extended out on a side of one surface of the main body.

An aspect of the present invention provides a stator member in which a plurality of the above-described coils is arranged.

An aspect of the present invention provides a stator including: the above-described coil; and a stator core to which the coil is attached.

An aspect of the present invention provides a motor including the above-described stator member.

An aspect of the present invention provides a motor including the above-described stator.

Advantageous Effects of Invention

The present invention can provide a coil, a stator member, a stator, and a motor that are configured to, in the case of joining (connecting) a busbar and the coil's terminals, simplify control necessary for joining such as positioning, actualize downsizing of a device (joining unit or stator manufacturing device), and improve efficiency of joining work.

DETAILED DESCRIPTION OF THE DISCLOSURE

An embodiment of the present invention will now be described below with reference to the drawings.

<Coil>

Figure 1:
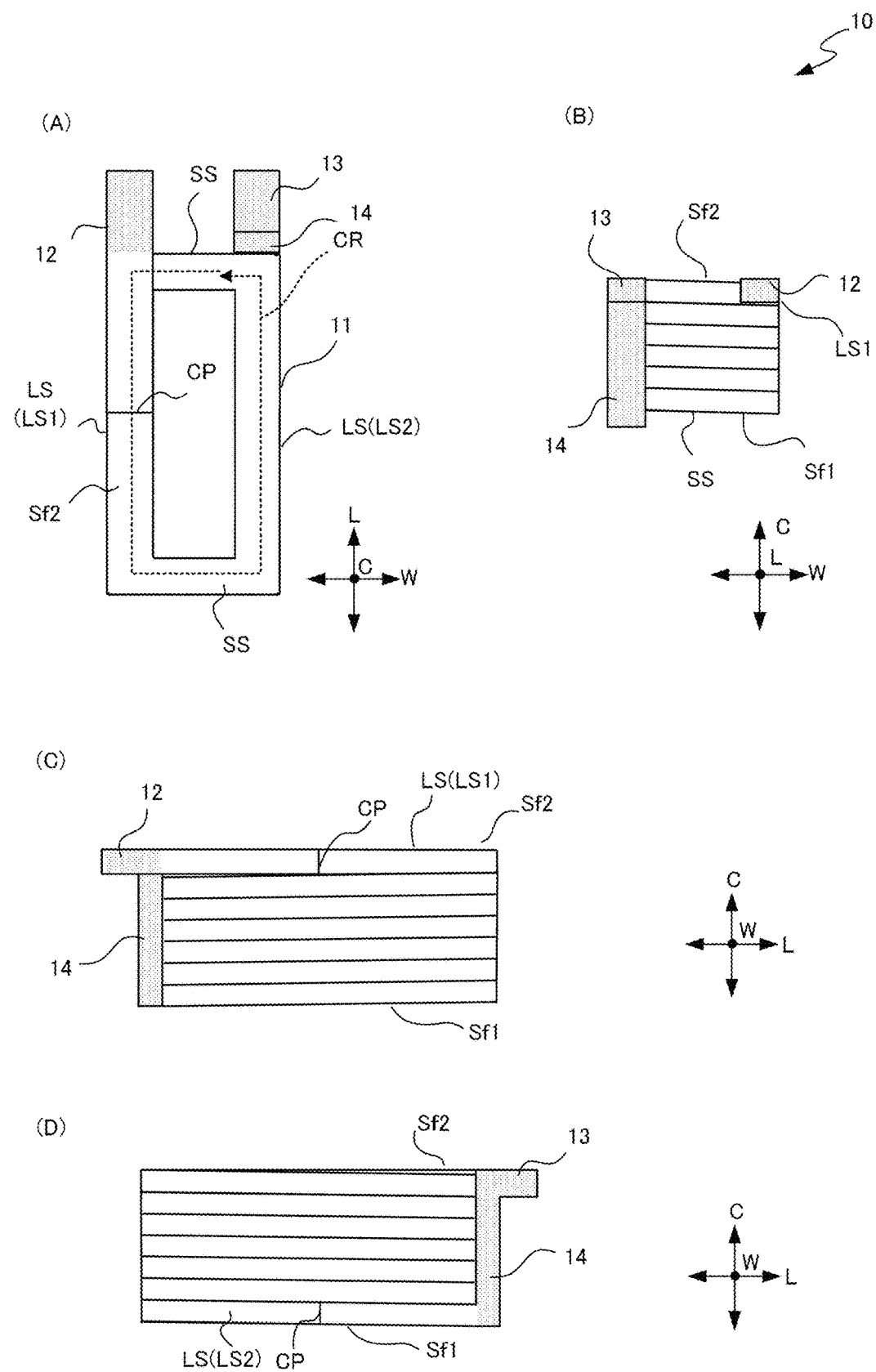
FIG. 1 includes drawings illustrating a coil of the present embodiment, in which (A) is a front view, (B) is a top view thereof, (C) is a side view thereof, and (D) is a side view thereof.

FIG. 1 includes drawings illustrating a coil 10 of the present embodiment, in which FIG. 1(A) is a front view viewed from an axial direction of a helical structure, FIG.

1(B) is a top view viewed from an outlet side of the terminals (from above of FIG. 1(A)), FIG. 1(C) is a side view viewed from a left direction of FIG. 1(A), and FIG. 1(D) is a side view viewed from a right direction of FIG. 1(A).

As illustrated in FIG. 1, the coil 10 of the present embodiment includes a main body 11, a first terminal 12, and a second terminal 13. The main body 11 is made of a conductor with a helical structure. The conductor is, for example, a flat conductor (flat rectangular conductor) whose cross section orthogonal to the traveling directions of the helical structure is substantially in the shape of a rectangle.

The main body 11 may be a helical structure body made by, for example, winding an elongated strip-shaped flat conductor or connecting (pressure welding, welding, or the like) a plurality of strip-shaped flat conductors (unit flat conductors) shorter than the coil 10 (complete helical structure body) continuously in the strip longitudinal directions. Specifically, in the case of connecting by pressure welding, for example, end surfaces of a plurality of unit flat conductors each having a length equal to or less than the length of a one-turn region of a welded helical structure body (or a length exceed the length of the one-turn region) can be pressed against each other along the strip longitudinal directions at a straight portion to form a turn region, and the helical structure body can be formed by connecting the turn regions.

Here, in this specification, a first direction along the axis of the helical structure is referred to as an axial direction C of the coil 10 (helical structure body). A second direction that is orthogonal to the axial direction C and that is along one of the traveling directions of the helical structure is referred to as a width direction W of the coil 10 (helical structure body). A third direction that is orthogonal to the first and second directions and that is along the other of the traveling directions of the helical structure is referred to as a length direction L of the coil 10 (helical structure body).

In an example illustrated in FIG. 1, the shape of the main body 11 is an approximately rectangular shape with short sides SS and long sides LS as viewed in the front view (FIG. 1(A)) in the axial direction C of the helical structure body (winding), in which the width direction W coincides with the extending direction of the short sides SS and the length direction L coincides with the direction of the long sides LS.

The helical structure body can also be a lamination body in which a plurality of approximately rectangular shaped regions for one turn (hereinafter referred to as "one-turn regions CR"), indicated by a dashed arrow in FIG. 1(A), are laminated (overlayed). The axial direction C coincides with a lamination direction of the one-turn region CR or a thickness direction.

As described above, the coil 10 in this example is a so-called edgewise coil containing the main body 11 in which the helical structure body is formed of the continuous strip-shaped flat conductor. However, not limited to this, the helical structure body may be formed by winding a round conductor (round wire conductor) whose cross section orthogonal to the traveling directions of the helical structure is approximately round, or by connecting (pressure welding, welding, or the like) a plurality of strip-shaped round conductors. That is, the shape of the main body 11 may be in the shape of an ellipse (oval) in the front view illustrated in FIG. 1(A).

The first terminal 12 and the second terminal 13 are provided as a pair in the single main body 11. The first terminal 12 and the second terminal 13 are portions (portions indicated by dot hatching in FIG. 1) in which a pair of ends, which are the beginning and end of the coil 10, are extended out from the main body 11 (helical structure portion, turn portions) to the outside along the helical traveling directions, and both the first and second terminals 12 and 13 are extended out to the same side along the width direction W or the length direction L of the main body 11. In the example of FIG. 1, the first and second terminals 12 and 13 are extended out on a side of one of the short sides SS (on a side of an upper short side SS in FIG. 1(A)) along the width direction W of the approximately rectangular helical structure body. The second terminal 13 includes an extending portion 14 (described later).

In this example, the first terminal 12 and the second terminal 13 are configured as part of the flat conductor (unit flat conductors), and each joined to the main body 11 by, for example, pressure welding. That is, welded portions CP between the flat conductor including the first terminal 12 and the main body 11 (helical structure body), also between the flat conductor including the second terminal 13 and the main body 11 (helical structure body) are provided in the straight portions of the one-turn regions CR. Each of the first terminal 12 and the second terminal 13 may be joined to the main body 11 by welding or the like. In the case of connecting by welding, as illustrated in FIG. 1, the first terminal 12 and the second terminal 13 may be part of the flat conductor (unit flat conductors), or the first terminal 12 and the second terminal 13 (conductors of only regions indicated by dot hatching) may be joined to the helical structure body.

Furthermore, the first terminal 12 and the second terminal 13 of the present embodiment are extended out on a side of a certain surface defined by the width direction W and the length direction L of the main body 11. Specifically, in a case in which the helical structure body is a lamination body of the one-turn regions CR, both the first terminal 12 and the second terminal 13 are extended out to positions on a surface side (on a side of an uppermost surface or a lowermost surface illustrated in FIGS. 1(B) to 1(D)) in which one of outermost one-turn regions CR in the axial direction C (thickness direction) of the lamination body is present.

Specifically, in the example of FIG. 1, the first terminal 12 is configured to be extended out from the side of one of outermost surfaces (for example, a surface in which the one-turn region CR composing a topmost layer is present) in the axial direction C in FIGS. 1(B) to 1(D), and the second terminal 13 is extended out from the side of the other outermost surface (for example, a surface in which the one-turn region CR composing a bottommost layer is present), via the extending portion 14 extending along the axial direction C of the helical structure of the main body 11, to the side of the one of the outermost surfaces (the surface in which the one-turn region CR composing the topmost layer is present). That is, the extending portion 14 is provided across a plurality of laminated one-turn regions CR in the axial direction C (thickness direction), in order to extend out the second terminal 13, which is extended out from the side of one of the outermost surfaces (hereinafter referred to as a first surface Sf1) in the lamination direction of the main body 11 (lamination body), to the side of the other outermost surface (hereinafter referred to as a second surface Sf2) in the lamination direction. The first terminal 12 and the second terminal 13 are merely referred to separately for convenience of description, and the same holds true even when these are interchanged. That is, the first terminal 12 may be configured to have the extending portion 14.

Similarly, the topmost layer and the bottommost layer (top surface and bottom surface) of the lamination body are merely referred to separately for convenience of description, and the same holds true even when these are interchanged.

As illustrated in FIG. 1(D), the extending portion 14 is provided so as to be extended out from one of the long sides LS of the one-turn region CR of the first surface Sf1, bent so as to extend in the axial direction C of the helical structure body across the plurality of laminated one-turn regions CR, and bent again on the side of the second surface Sf2 so as to extend to the helical traveling direction (turn direction) of the helical structure body. Thereby, the first terminal 12 and the second terminal 13 are extended out so as to be aligned side by side on the side of the second surface Sf2.

<Stator Member>

Figure 2:
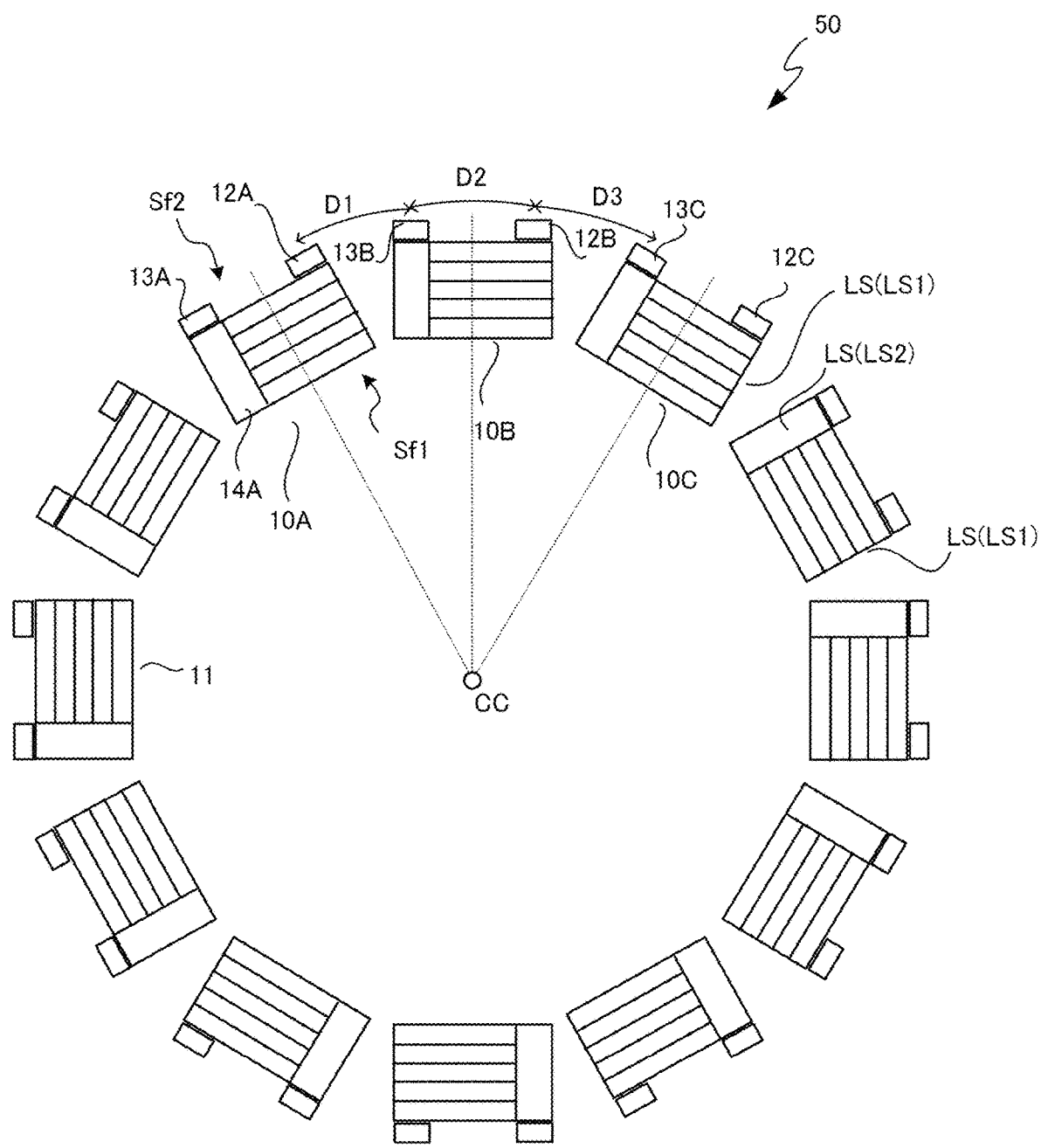
FIG. 2 is a top view illustrating a stator member of the present embodiment.

With reference to FIG. 2, a stator member 50 of the present embodiment will be described. FIG. 2 is a top schematic view of an annular stator member 50 viewed in an axial direction thereof.

The stator member 50 constitutes an annular body that is configured by arranging a plurality of the coils 10 illustrated in FIG. 1, in such a manner that the long sides LS are adjacent to each other.

Specifically, the coils 10 (10A, 10B, 10C . . . ) are arranged so that the axes (indicated by dashed lines as virtual lines) of the respective helical structure bodies converge at a single point on a central axis CC (extending in the front and back directions of the paper) of the annular body.

As described above, each of the coils 10 includes the first terminal 12 and the second terminal 13 that are extended out on a side of a certain surface (for example, the side of the second surface Sf2) of the main body 11. That is, all the first terminals 12 and the second terminals 13 of the plurality of coils 10 are extended out on the side of the same peripheral surface (in this example, the side of an outer peripheral surface Sf2) of the annular stator member 50. In other words, the coils 10 are arranged so that an outlet direction of the first terminal 12 and the second terminal 13 of each coil 10 is positioned on the same side (outer peripheral side in FIG. 2) in the length direction L (direction along the central axis CC of the annular body) of each coil 10.

In conventional coils and stator members configured therewith, first terminals are extended out, for example, on an outer peripheral surface side of the stator member, which is an annular body, and second terminals are extended out on an inner peripheral surface side of the stator member. Accordingly, when connecting the first and second terminals to a busbar or the like, a connecting unit (e.g., joining (pressure welding) device (welding device)) to the busbar must be moved between the inner peripheral surface side and the outer peripheral surface side of the stator member, which results in cumbersome or complicated control necessary for connecting (for example, control for positioning or the like). Furthermore, movement range of the joining unit (welding device) increases, thus preventing downsizing of the device (joining device (welding device), a stator (member) manufacturing device, or the like) and also hindering improvement in efficiency of connecting work.

However, in the present embodiment, the first terminals 12 and the second terminals 13 of all the plurality of coils 10 are extended out on the same peripheral side (e.g., the side of the outer peripheral surface Sf2) of the stator member 50, which is the annular body. In the case of joining the terminals (connecting) to a busbar, this results in simplifying control necessary for joining, such as positioning, actualizes downsizing of the device (joining device (welding device), a stator (member) manufacturing device, or the like), and also improves efficiency of joining work.

Furthermore, in the present embodiment, the first terminals 12 and the second terminals 13 that are adjacent to each other in a circumferential direction (arranged in the circumferential direction) of the plurality of coils 10 are arranged to be approximately equally spaced. Specifically, the distance between the first terminal 12 and the second terminal 13 of one of the coils 10 is equal to (approximately the same space) the distance between the first terminal 12 of the one of the coils 10 and the second terminal 13 of another coil 10 adjacent thereto.

For example, with reference to FIG. 1(D), the second terminal 13 is extended out from the helical structure body to the outside, in such a manner that the extending portion 14 is provided so as to extend out from one long side LS2 of the one-turn region CR of the first surface Sf1 (e.g., the inner peripheral surface in the case of annular arrangement as the stator member 50) to the extending direction of the long side LS2 (the right direction of FIG. 1(D)), bent so as to extend in the axial direction C of the helical structure body across the plurality of laminated one-turn regions CR to the side of the second surface Sf2 (e.g., the outer peripheral surface in the case of annular arrangement as the stator member 50), and bent again on the side of the outer peripheral surface Sf2 so as to extend to the helical traveling directions (turn direction) of the helical structure body (so as to extend along the long side LS2 corresponding to the one-turn region CR on the outer peripheral surface side).

As illustrated in FIGS. 1(A) and 1(C), the first terminal 12 is extended out from the long side LS1 (the long side LS1 opposite the long side LS2 from which the second terminal 13 is extended out) of the one-turn region CR of the second surface (outer peripheral surface) Sf2 to the extending direction of the long side LS1.

As illustrated in FIG. 2, the distance (distance along the circumferential direction of the annular body) D2 between a first terminal 12B and a second terminal 13B of a certain coil 10B is configured to be spaced approximately equal to the distance (distance along the circumferential direction of the outer periphery of the annular body) D1 between the second terminal 13B of the coil 10B and a first terminal 12A of a coil 10A adjacent thereto. Similarly, the distance (distance along the circumferential direction of the outer periphery of the annular body) D3 between the first terminal 12B of the coil 10B and a second terminal 13C of a coil 10C adjacent thereto is configured to be spaced approximately equal to the distance D1, D2 (same for all coils 10).

Configured in this way, in the case of joining (connecting) the coils to a busbar, it is possible to further simplify control necessary for joining such as positioning, and improve efficiency of joining work.

The outlet shape of the first terminal 12 and the second terminal 13 in the example above is merely an example, and can be configured as appropriate, in accordance with the shape of the coils 10, so that the distances D1, D2, D3 . . . , between the first terminal 12 and the second terminal 13 of the coils 10 constituting the stator member 50, are equally spaced. Thus, for example, the first terminal 12 may have an extending portion along the short side SS of the helical structure body, and may be configured so as to extend out from the helical structure body after being bent at one end along the short side SS of the helical structure body. The extending portion 14 of the second terminal 13 may be extended out from the helical structure body after being bent along the short side SS so as to be close to or separated from the first terminal 12. The respective extending portions of the first terminal 12 and the second terminal 13 may be extended out from the helical structure body after being bent in the direction of the short side SS with respect to each other.

All the first terminals 12 and the second terminals 13 of the plurality of coils 10 may be configured to be extended out on the side of the first surface Sf1 (inner peripheral surface) of the stator member 50. However, since the circumference of the inner peripheral surface Sf1 is smaller than that of the outer peripheral surface Sf2, flexibility in arranging for equal distances between the first terminal 12 and the second terminal 13 is reduced. The distance between the first terminal 12 and the second terminal 13 is also narrowed, and in general, a traveling distance of the joining unit (joining (pressure welding) device or welding device) to the busbar arranged outside the stator member 50 is increased. For this reason, the first terminals 12 and the second terminals 13 are preferably extended out on the side of the outer peripheral surface Sf2 of the stator member 50. On the other hand, in the case of disposing a joining unit inside the stator member 50, the first terminals 12 and the second terminals 13 may be extended out on the side of the inner peripheral surface Sf1 of the stator member 50.

<Stator>

Figure 3:
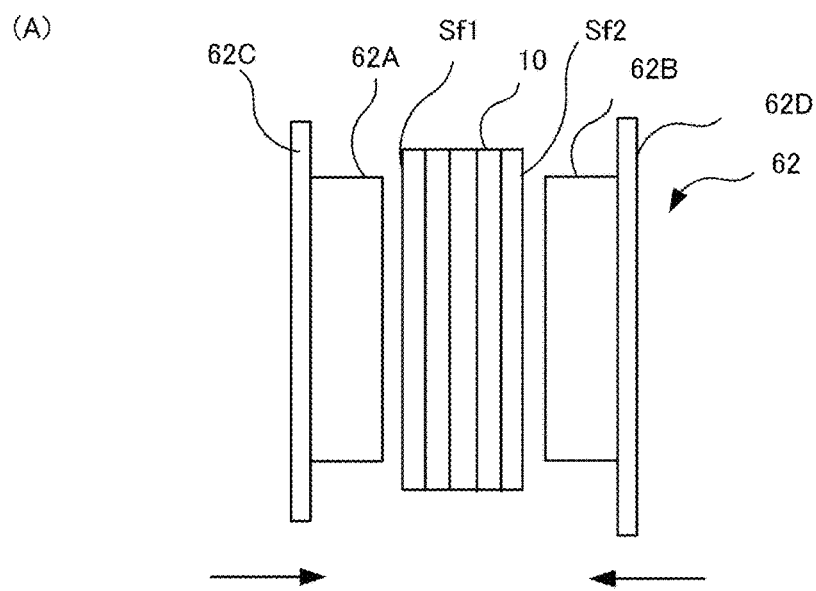
FIG. 3 includes drawings illustrating a stator of the present embodiment, in which (A) is a side view illustrating a coil to which a cassette is attached, and (B) is a tip view thereof.
Figure 3:
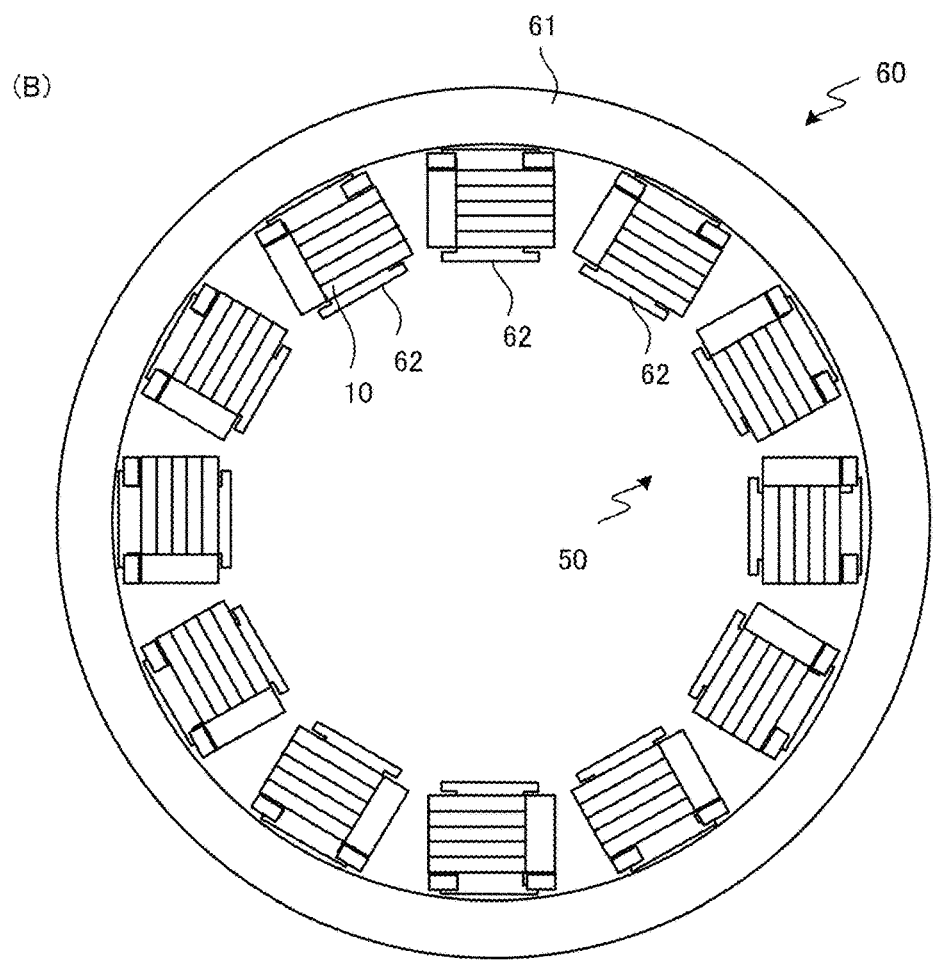

FIG. 3 is a drawing illustrating an outline of a stator 60 utilizing the coils 10 (stator member 50) of the present embodiment. FIG. 3(A) is a drawing illustrating an example of a method for attaching the coil 10, which is a side view of the coil 10 viewed from a peripheral direction of the stator 60. FIG. 3(B) is a top schematic view viewed from an axial direction of the stator 60.

The stator 60 of the present embodiment is formed, not by winding a strip-shaped conductor on a stator core 61, but by sequentially attaching the molded coils (edgewise coils) 10 to a plurality of cassettes (also referred to as slots or teeth) 62 provided in an inner peripheral surface of the annular (cylindrical) stator core 61 or integrally attaching the stator member 50, and by connecting one end of each of the annularly arranged coils 10 to the busbar (not illustrated).

Specifically, as illustrated in FIG. 3(A), cassettes 62 are attached to each of the plurality of coils 10.

For example, the cassettes 62 are prepared in pairs for each of the plurality of coils 10 (for a single coil 10) constituting the stator member 50. The pair of cassettes 62 (62A and 62B) have flange portions 62C and 62D on the side of the first surface Sf1 and on the side of the second surface Sf2 of the coil 10, respectively. The single coil 10 is inserted from the side of one cassette 62A, the side on which the flange portion 62C is not formed, and the other cassette 62B is overlapped from the side of the cassette 62B, the side on which the flange portion 62D is not formed, to engage the both, thus attaching the cassettes 62 to the coil 10. The cassettes 62 are similarly attached to every coil 10 constituting the stator member 50. Thereafter, as illustrated in FIG. 3(B), the coils 10 with the cassettes 62 are attached to the stator core 61. The cassettes 62 are engaged (fitted) in the stator core 61 at not-illustrated engagement portions (fitting portions).

Alternatively, for example, in the stator member 50 in which the plurality of annularly arranged coils 10 are connected and integrated by the not-illustrated busbar or the like, the cassettes 62 are attached as described above to each of the coils 10, and the stator member 50 with the cassettes 62 is attached to the stator core 61.

Although the illustration of the busbar is omitted, for example, a circular wiring portion and coil connection ends are integrally configured by punching of a metal material (e.g., a copper plate) or the like. The coil connection ends are joined to the first terminals 12 and the second terminals 13 of the coils 10 by pressure welding, welding, screwing, or the like.

Figure 4:
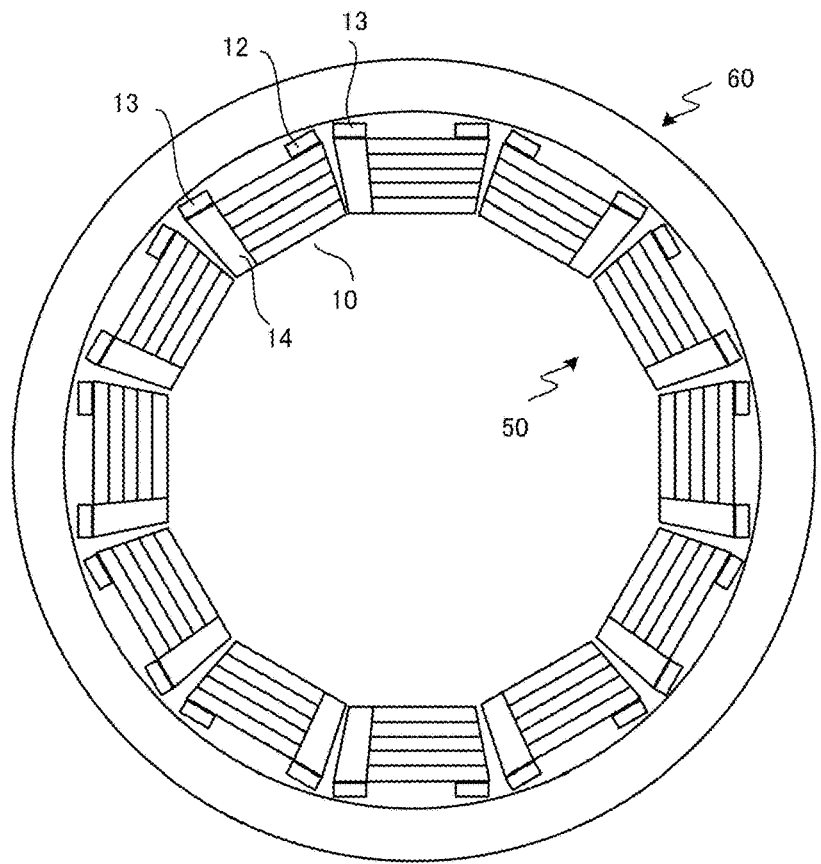
FIG. 4 is a top view illustrating another aspect of the stator member of the present embodiment.

FIG. 4 is a top view illustrating another aspect of the stator member 50 of the present embodiment. In FIG. 4, the illustration of the cassettes 62 is omitted. The form of the helical structure body of the coil 10 of the present embodiment is not limited to that illustrated in FIG. 1. For example, as illustrated in FIG. 4, the helical structure body may be configured in an approximately trapezoidal shape, that is, an approximately quadrangular pyramid trapezoidal form viewed from the top. In this case, the coil 10 may be made of a flat conductor whose width (length in a direction which intersects the helical traveling direction) gradually decreases along the helical traveling direction, while whose thickness (length in the axial direction of the helical structure body) gradually increases, and a cross-sectional area perpendicular to the helical traveling direction is equal in the helical traveling direction.

In this example, the first terminals 12 and the second terminals 13 need only be aligned and extended out to the same peripheral surface (e.g., outer peripheral surface) of the annular body, and the distance between the first terminal 12 and the second terminal 13 of one coil 10 may or may not be the same as the distance between the first terminal 12 of the one coil 10 and the second terminal 13 of another adjacent coil 10.

<Motor>

Figure 5:
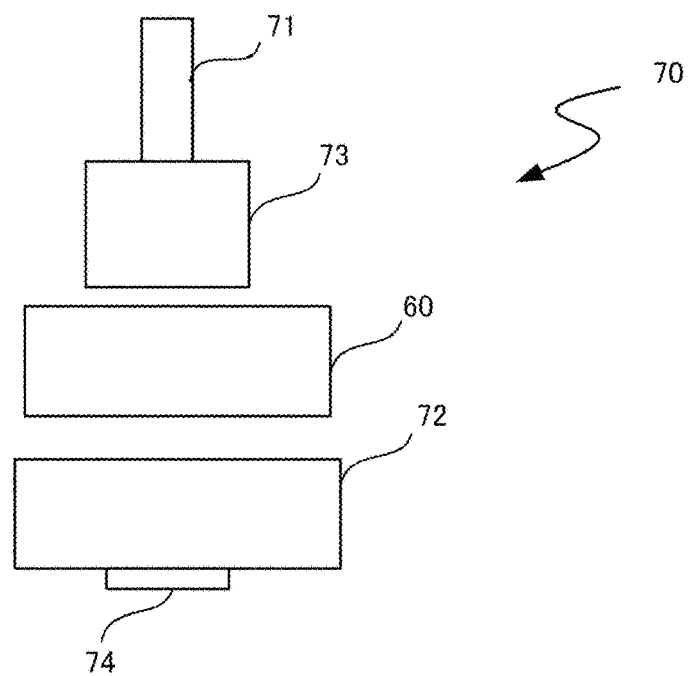
FIG. 5 is an exploded side view of a motor of the present embodiment.

FIG. 5 is an exploded side view illustrating an outline of a motor 70 utilizing the stator 60 (or the stator member 50) of the present embodiment.

As illustrated in the drawing, a rotor 73 is assembled to the above-described stator 60 and made to be rotatable, to obtain a motor (single-phase motor, three-phase motor, or the like) 70. Specifically, the motor 70 has, for example, a shaft 71, a housing 72, the rotor 73, the stator 60 (illustrated in FIG. 3), and the like. The shaft 71 is a columnar member, and rotates about its central axis while being supported by a bearing 74 provided in, for example, the housing 72. To one end of the shaft 71, a device (not illustrated) to be driven is coupled via a power transmission mechanism such as a gear.

The rotor 73 has magnets (not illustrated) disposed in its circumferential direction, and rotates together with the shaft 71. The stator 60 is disposed, for example, outside the rotor 73 in a radial direction, and generates a force to rotate the rotor 73. An external terminal (not illustrated) of the stator 60 is connected to a drive circuit or a power supply (both are not illustrated) that supplies power to the motor via a lead, for example.

Upon applying a drive current to the coils 10 through the busbar (not illustrated), the motor 70 generates magnetic fluxes in the cassettes 62 of the stator 60. Then, torque is generated in the circumferential direction by the action of the magnetic flux between the cassette 62 and magnet (not illustrated). As a result, the rotor 73 rotates about the central axis with respect to the stator 60.

Although not illustrated, the motor 70 of the present embodiment is not limited to one configured with the stator 60 as illustrated in FIG. 3, as long as the motor 70 is configured so as to include the coil 10 illustrated in FIG. 1 or the stator member 50 illustrated in FIG. 2.

The present invention is not limited to the embodiment described above, but, as a matter of course, various modifications may be made within a range without deviating from the gist of the present invention.

INDUSTRIAL APPLICABILITY

The present invention can be applied to stators and motors.

REFERENCE SIGNS LIST (10A, 10B, 10C . . . ) coil
11 main body
12, 12A, 12B first terminal
13, 13A, 13B second terminal
14 extending portion
50 stator member
60 stator
61 stator core
62, 62A, 62B cassette
62C, 62D flange portion
70 motor
71 shaft
72 housing
73 rotor
74 bearing

The invention claimed is:

1. A coil comprising:
a main body made of a continuous strip-shaped flat conductor with a helical structure; and a first terminal and a second terminal extended out from the main body, wherein
the first terminal and the second terminal are extended out on a same side of one surface of the main body in a direction extending in a long side of the main body, and
welded portions between the first terminal and the helical structure body and between the second terminal and the helical structure body are provided in straight portions of the flat conductor.

2. The coil according to claim 1, wherein one of the first terminal and the second terminal has an extending portion that extends in an axial direction of the helical structure of the main body.

3. The coil according to claim 1, wherein the coil includes an approximately rectangular one-turn region of the helical structure body obtained by pressing end surfaces of a plurality of unit flat conductors, each having a length equal to or less than a length of the one-turn region, against each other along a strip longitudinal direction at the straight portion.

4. A stator member wherein a plurality of the coils according to claim 1 is arranged.

5. The stator member according to claim 4, wherein the first terminal and the second terminal that are adjacent to each other in the plurality of coils are arranged to be approximately equally spaced.

6. The stator member according to claim 4, wherein:
the plurality of coils is arranged to constitute an annular body; and
the first terminals and the second terminals are extended out on a side of an inner peripheral surface or an outer peripheral surface of the annular body.

7. The stator member according to claim 6, wherein the first terminals and the second terminals are extended out on the side of the outer peripheral surface of the annular body.

8. A stator comprising: the coil according claim 1; and a stator core to which the coil is attached.

9. A motor comprising the stator member according to claim 4.

10. A motor comprising the stator according to claim 8.

* * * * *